(12) United States Patent
Suvorov (10) Patent No.: US 10,301,194 B2
(45) Date of Patent: May 28, 2019

(54) METHOD AND DEVICE FOR WATER TREATMENT USING RADIO WAVES (71) Applicant: Vladimir Suvorov, Zvenigorod (RU)

(72) Inventor: Vladimir Suvorov, Zvenigorod (RU)

( * ) Notice: Subject to any disclaimer, the term of this patent is extended or adjusted under 35 U.S.C. 154(b) by 154 days.

(21) Appl. No.: 15/314,262

(22) PCT Filed: May 28, 2015

(86) PCT No.: PCT/US2015/032824
§ 371 (c)(1),
(2) Date: Nov. 28, 2016

(87) PCT Pub. No.: WO2015/184062
PCT Pub. Date: Dec. 3, 2015

(65) Prior Publication Data
US 2017/0101327 A1    Apr. 13, 2017

Related U.S. Application Data (63) Continuation-in-part of application No. 14/292,273, filed on May 30, 2014.

(51) Int. Cl.
C02F 1/30    (2006.01)
C02F 1/48    (2006.01)
C02F 5/02    (2006.01)
C02F 1/00    (2006.01)
C02F 1/28    (2006.01)
C02F 1/52    (2006.01)
C02F 1/74    (2006.01)

(52) U.S. Cl.
CPC ............... C02F 1/30 (2013.01); C02F 1/487 (2013.01); C02F 5/02 (2013.01); C02F 1/004 (2013.01); C02F 1/281 (2013.01); C02F 1/302 (2013.01); C02F 1/52 (2013.01); C02F 1/74 (2013.01); C02F 2303/22 (2013.01); C02F 2307/14 (2013.01)

(58) Field of Classification Search
CPC .................................. C02F 1/30; C02F 1/302
See application file for complete search history.

(56) References Cited

U.S. PATENT DOCUMENTS

| | | | | |
|---|---|---|---|---|
| 4,298,467 A * | 11/1981 | Gartner | ..................... | C02F 1/78 210/109 |
| 4,865,747 A * | 9/1989 | Larson | ..................... | C02F 1/487 210/222 |
| 7,165,451 B1 * | 1/2007 | Brooks | ................ | A61B 5/0093 601/2 |
| 7,981,288 B2 * | 7/2011 | Bradley | .................. | C02F 1/487 204/660 |

(Continued)

*Primary Examiner* — Donald R Spamer
(74) *Attorney, Agent, or Firm* — Nadya Reingand; Yan Hankin (57) ABSTRACT A method, device, and system for treating water solutions is disclosed for the purpose of preventing the formation of deposits on the inner surface of pipelines, boilers and other equipment. The method is based on the use of radio waves which are sent in batches of four pulses, either of equal amplitude or with larger amplitude of the first pulse and smaller the last. Different hatches have different interval between pulses. The water treatment system disclosed which is based on the method; it significantly improves a water solution's properties without extensive usage of chemicals.

17 Claims, 6 Drawing Sheets (56) References Cited

U.S. PATENT DOCUMENTS

2012/0138517 A1\* 6/2012 Alley .................. B01D 61/025
  210/138
2013/0269810 A1\* 10/2013 Stefanini ................ B01J 19/129
  137/803

\* cited by examiner

METHOD AND DEVICE FOR WATER TREATMENT USING RADIO WAVES

CROSS-REFERENCE

The present patent application is a National Stage application of PCT application No. PCT/US2015/032824 filed on May 28, 2015 which claims priority to U.S. patent application Ser. No. 14/292,273 filed on May 30, 2014.

FIELD OF THE INVENTION

The present invention relates to technologies for the treatment of water solutions and other fluids, particularly to the treatment of water solutions moving through pipes, pipelines, and other water-carrying equipment.

BACKGROUND OF THE INVENTION

Water impurities, such as calcium, magnesium, and other chemical compounds, form a lime-scale, which, adheres to the interior walls of water pipes. In water heaters and steam boilers the lime-scale formation occurs even faster, which cause increasing of energy consumption, downtime of facilities, and premature equipment wear and tear.

Treatment of water solutions with radiowave signals has a variety of applications including, but not limited to, the following: preventing or inhibiting lime-scale formation, improving the efficiency of suspended solids sedimentation, reducing the consumption of chemicals for water treatment, and inhibiting bio-substances.

Most of existing methods for water treatment with an electromagnetic, field use a random or pseudo-random set of electromagnetic pulses in the range of radiowave frequencies of 5-40 kHz.

Two main types of such devices exist, which differ by the way how the signal is sent into the water. There are some methods that use inductors reeled around the pipe (see, for example, U.S. Pat. No. 6,706,170) and others that use a magnetic core with high magnetic permeability (ferrite) (see, for example, U.S. Pat. No. 5,667,677). The disadvantage of the first mentioned method is significantly energy losses during the signal transfer into the water. As a result, this undermines the efficiency of such treatment. The most effective way to transfer the energy of a radiowave signal into a fluid inside a pipe is a ferrite core surrounding the pipe. Ferrite material has superior magnetic properties in comparison with, e.g., inductors comprising wire reeled around a pipe.

The disadvantage of the second mentioned method above, U.S. Pat. No. 5,667,677, which affects at the resonant frequencies of the water solution with pulses with random intervals between them, is that the resonance occurs relatively rarely. Only high frequency of waves (relative to the speed of the water flow) and high distance of wave's propagation make using of this method effective. In addition, this device is analog and cannot be tuned for water solution properties.

Proposed device affect at well at the frequencies close to resonance, what increase efficiency of the treatment. Device have more efficient emitter construction and special configuration of ferrites, what increase efficiency of the treatment. Proposed device is digital and programmable. It has self-diagnostics and indicator, reflecting the peak amplitude of the induced signal. This is useful as for diagnostic of proper device functionality and for setup accuracy. Both are valuable for customers and customer service.

Proposed water purification system made on the base of the device clean the water without chemicals.

SUMMARY OF THE INVENTION

One embodiment of the present invention comprises a device for treating a fluid, comprising a radiowave generator, which is attached to a pipe, containing the fluid; the generator emits a series of pulses into the fluid.

In second embodiment, the pulses are grouped in batches of four equal pulses. Such batches of pulses cause creating structures in the water and subsequent destruction of just created structures.

In some embodiments, amplitude of pulses in the batch can be different. For example, the last pulse in the batch can have smaller amplitude and thereby not to break prematurely created structures in the water before the proper time. While the first pulse in the batch may have bigger amplitude. This contributes rupture of structures in the water and cause more intense cavitation.

In some embodiments, to the batches of pulses, between the main pulses, can be added pulses with small amplitude. Such pulses can cause the so-called secondary cavitation and increase efficiency of the treatment.

In some embodiments, pauses with variable duration can be added between the batches of pulses to provide extra time for the formation of structures in the water.

In some embodiments, pulses are generated only in specific areas inside the range of operating frequencies.

In yet other embodiments, the device further comprises a programmable microcontroller for triggering pulses generation, thus ensuring that the generator emits pulses at a desired rate.

In some embodiments, the microcontroller may comprise a program for creating sequential or simultaneous pulses sets to target a fluid with particular chemical and biological composition, or fluid containing a regionally-, geographically-, or source-specific compound.

In some embodiments, the emitter of the device further comprises a magnetic core having a plurality of detachable sections; the sections being placed around the pipe and providing for adjustment of the device's positioning on pipes based on their diameters. The detachable sections may comprise a ferrite material with a high magnetic permeability and low energy loss.

In some embodiments, the ferrite cores have special dimensions to avoid formation of standing waves inside them.

Some embodiments of the device further comprise an indicator coupled to a digital display for showing the peak amplitude of induced pulses. This helps determine if the device is correctly positioned on the pipe and if normal operation is occurring. The indicator may further comprise a control winding of an electrical wire around a magnetic core, so that a signal from the winding may be transmitted to the digital display for displaying peak amplitudes.

Also disclosed herein is a fluid treatment system, comprising a device as described by any or all of the above embodiments, and wherein at least part of the fluid passes through the device two or more times.

The device or method disclosed herein may further comprise a fluid reaction tank, an absorbent filter, a fluid pump, an air compressor, an air valve, fluid valves, a drain channel and control elements.

BRIEF DESCRIPTION OF THE DRAWINGS

The foregoing summary, as well as the following description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE PREFERRED EMBODIMENT

Figure 1:
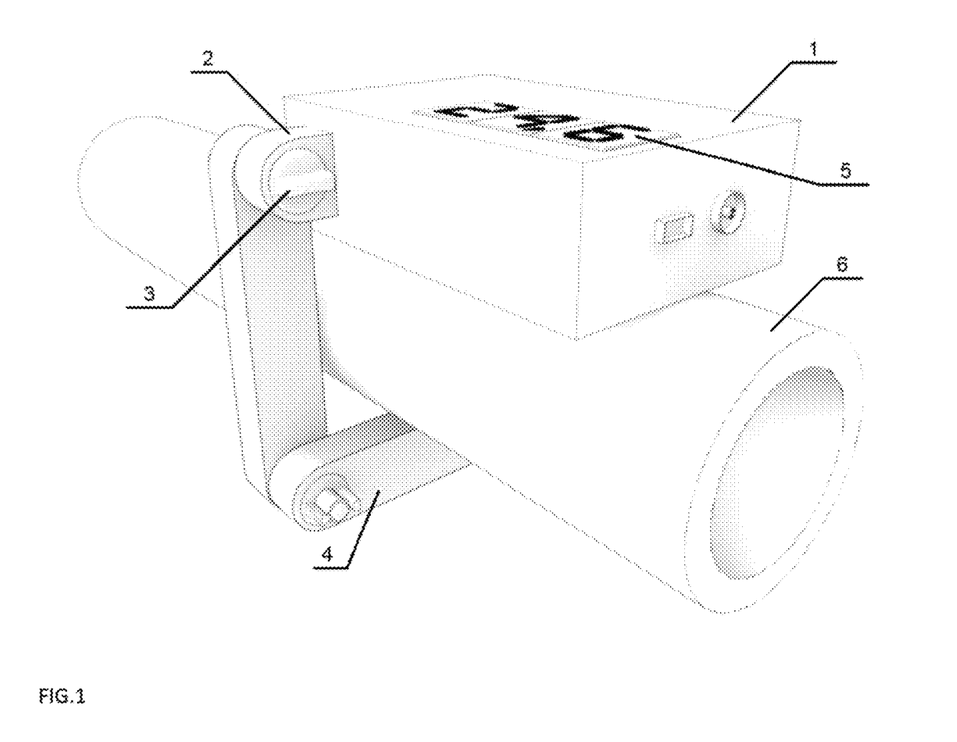
FIG. 1 represents a device implementing the method according to the present invention.

FIG. 1 represents an example device for treating a fluid, implementing the method according to the present invention. The housing 1 of the device is exteriorly attached to the pipe 6 and fixed to the pipe (not shown). Primary ferrite core section 2, extends through the device housing 1 and exits on the opposite side. Detachable ferrite core sections 4 connected with plastic bolts and nuts 3, form together with primary ferrite core section 2 closed ring. A digital display 5, showing the peak amplitude of the induced electromagnetic field, is placed on the top of the device 1.

Figure 2:
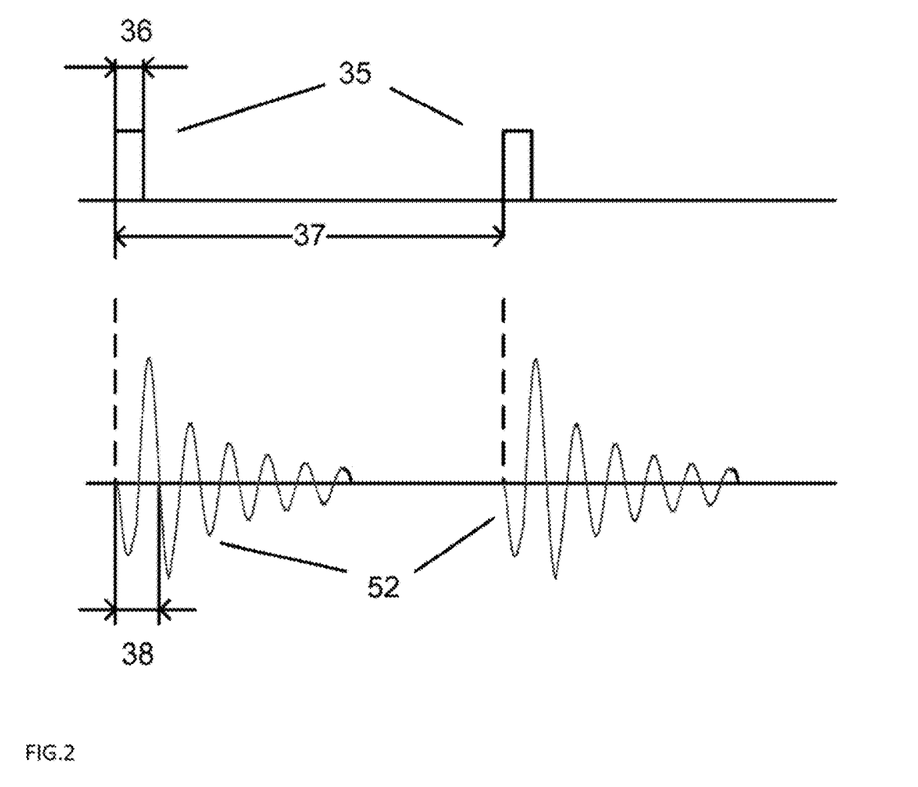
FIG. 2 represents a timing diagram of trigger and output pulses of the device.

Logic circuit of the device form triggering pulses 35 (FIG. 2), and the output node of the device (emitter) emit pulses 52, reminiscent of an exponentially-decaying sinusoid to the pipe with a liquid. FIG. 2. 35—triggering pulses, 36—duration of the trigger pulse, 37—interval between triggering pulses (20-200 uS, i.e. frequency 5-50 kHz), a 38—period of waves at the output of the device (on a ferrite ring and in the water) (the frequency is 120-190 kHz).

Figure 3:
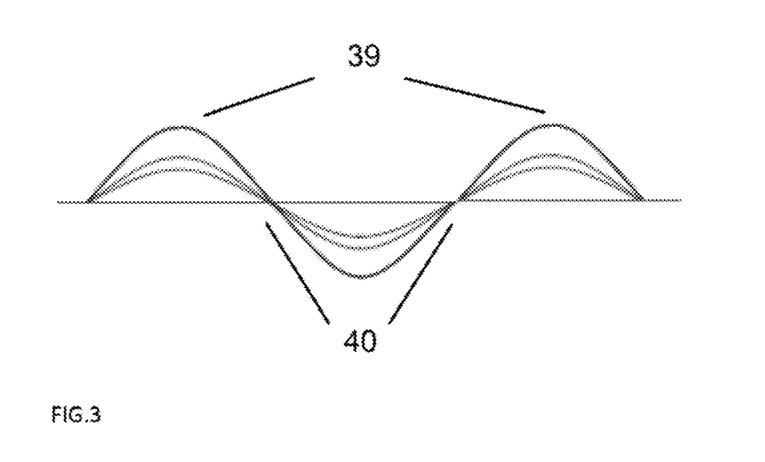
FIG. 3 represents a diagram of adding waves with the same phase so-called as "standing waves".

Waves of the generated electromagnetic field are directed along the pipe axis. The waves reflect from the bends of die pipes, from the equipment (pumps, boilers, etc). Reflected wave of previous pulses and re-generated wave overlap occur. The coincidence of their phases and frequencies cause a sharp increase of the amplitude of the resultant wave known as resonance. FIG. 3 represents a diagram of "standing waves", with antinodes 39 and nodes 40. Resonance occurs formation of so-called clusters—amorphous bunches of ions, which later become the base for crystals of calcium carbonate (lime-scale) growing. Thus, device stimulates the crystallization of calcium carbonate. However, it occurs in the volume of water, away from the walls of pipes and equipment. Forming a plurality of tiny crystals with the size of 5-50 microns (in 2-20 times less than the thickness of a human hair), which are taken away from the system with water flow. As a result, the amount of deposits on the inner surfaces of the pipes and equipment significantly reduce.

In real conditions, parameters of reflected wave depend on many factors—from geometry of the pip location of device, its operating frequency, level of tightening of ferrite fastening bolts and etc. For waves with random intervals between them, the probability of coincidence of the frequency of the new wave and reflected wave is very low.

Figure 4:
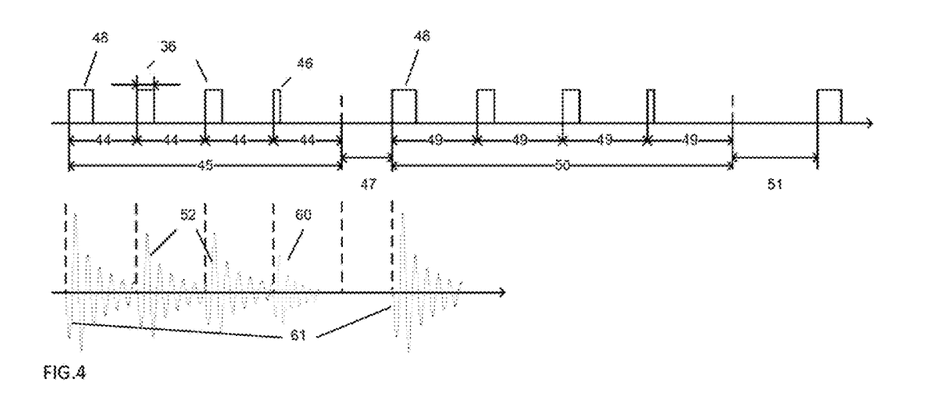
FIG. 4 represents a timing diagram of batches of trigger pulses and output pulses.

As shown by experiments with the model, generation the waves with the frequency close but not equal to the resonance, on the 3rd pulse, a phenomenon reminiscent of a weak resonance appears. With the 4th pulse it has more power, and with the next pulses this weak resonance disappears. Generation of batches of pulses made from 4 pcs, with equal intervals between them, with a randomly change of the interval between pulses at the next batch increase the intensity of crystallization in compare with generation of single pulses with random interval between them. FIG. 4 represent a timing diagram of batches of trigger pulses 45, 50 and output pulses 52.

This happens because the water in some conditions adapts to external influence (batch of pulses), with formation of some structure. Change of the oscillation frequency (in the next batch) leads to destruction of this structure and cause appearance of weak cavitation in the areas closed to the nodes of the waves 40. Displacement of ions in the water solution by weak cavitation is stronger than caused by electromagnetic field. Forming of clusters proceeds with weak cavitation is more efficient. As a result, more suspended microcrystals of calcium carbonate (lime-scale) created.

Following methods can facilitate formation of structures in the water, subsequent destruction of these structures and cause more intense cavitation.

The first embodiment: Amplitude of pulses in the batch can be different. For example, the last pulse in the batch has smaller amplitude and thereby it dues not break prematurely created structures in the water before the proper time. While the first pulse in the batch has bigger amplitude to rupture of structures in the water and cause more intense cavitation. Amplitude of the pulses is controlled by duration of the trigger pulses. FIG. 4, 45, 50 are batches of trigger pulses, 44, 49 are durations between trigger pulses in the batch, 46—the last trigger pulse in the batch is shorter to reduce the amplitude of the pulse 60, 48—first trigger pulse have an extended duration to generate a pulse with greater amplitude 61.

The second embodiment: Pauses with variable duration 47, 51 are added between the batches of trigger pulses 45, 50 to provide extra time for the formation of structures in the water.

Figure 5:
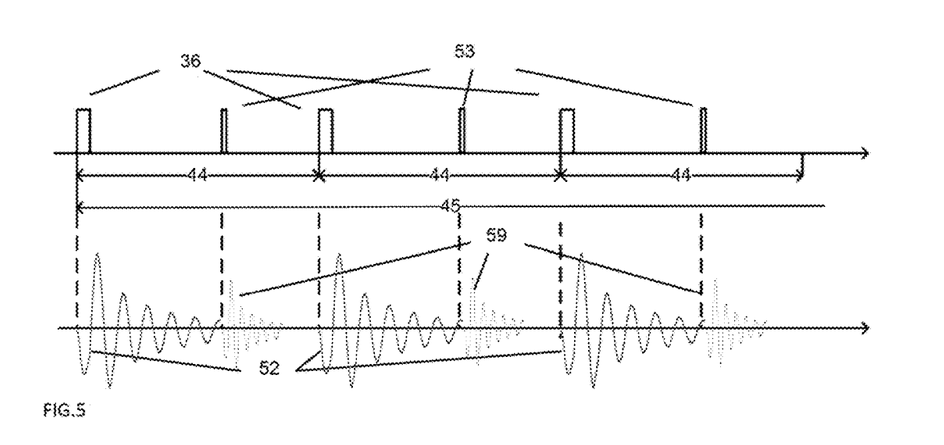
FIG. 5 represents a timing diagram of added pulses with very small (relatively) duration to the trigger pulses.

The third embodiment: FIG. 5. Trigger pulses with very small (relatively) duration 53 are added to the batches of trigger pulses, which adds pulses with small amplitude 59. Such pulses can cause the so-called secondary cavitation and increase efficiency of the treatment.

Figure 6:
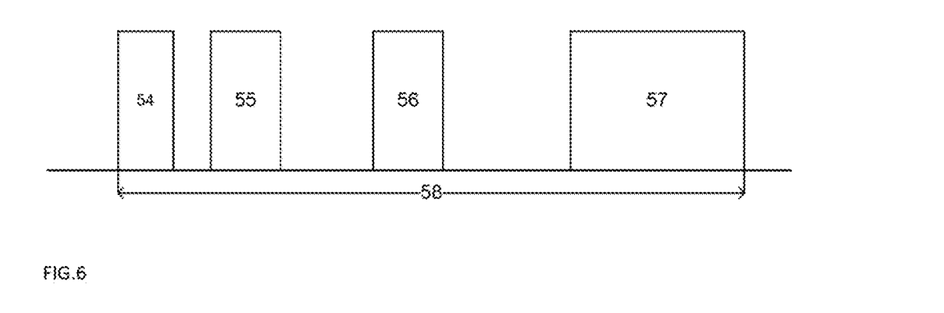
FIG. 6 represents working areas inside the frequency range of the device.

The fourth embodiment FIG. 6. Trigger pulses are generated only in specific areas 54, 55, 56, 57 inside the range of operating frequencies 58 of the triggering pulses. Some chemical components of the water solution "response" better at the external influence only for specific frequencies of ranges of frequencies. In this case, excluding "weak" areas, we increase efficiency of the treatment.

Figure 7:
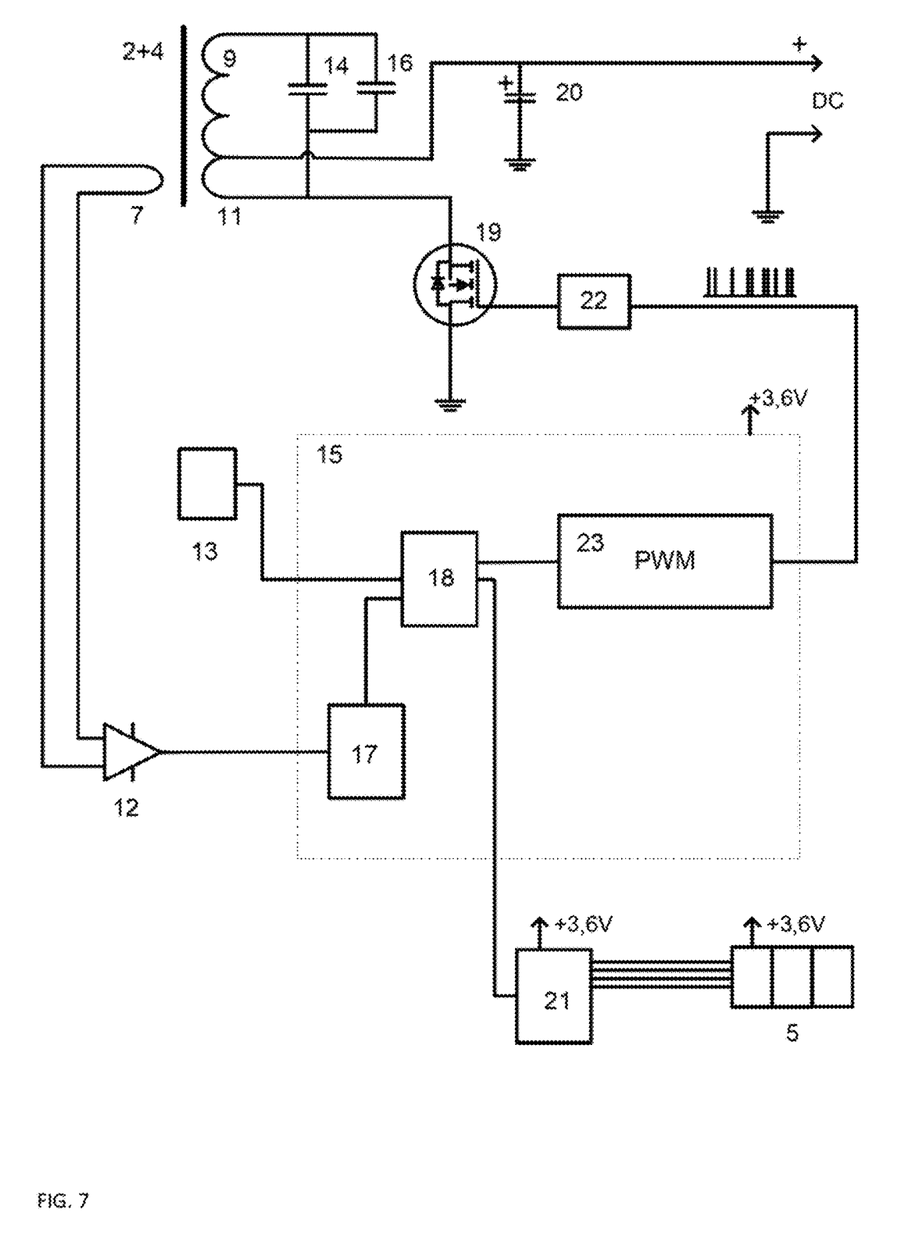
FIG. 7 represents the circuit diagram depicting the embodiment of the device according to the present invention.

The device is a hardware-software complex. FIG. 7 represents an example circuit diagram implementing the method according to the present invention. A fast and powerful programmable microcontroller 15 controls the device. It provides the required accuracy of trigger pulses generation, calculate duration of the new trigger pulses and provide required accuracy in measuring of the waves amplitude. The microcontroller 15 generates rectangular pulses with variable frequencies according to the embedded program, using a PWM module 23. The PWM module 23 operate the transistor 19 of the resonant amplifier with a driver (buffer) 22. Resonant amplifier is made under typical scheme. When the transistor 19 is open, the electric current travels through the energizing winding 11. At this moment, the capacitor 20 discharges and transfers additional energy to the resonant amplifier. Thus, an electromagnetic field is induced in the ferrite core (comprising a primary section 2 and multiple detachable sections 4, thus surrounding a pipe). This creates oscillations in the resonant contour: inductors 9 and 11—capacitors 14 and 16. The resonant contour forms sinusoidal pulses. When the transistor 19 is closed, the external power to the resonant contour energy is cut off, and oscillations in the contour slowly decay. Amplitude of the pulses is depends of the duration when transistor 19 is open, i.e. it depends of duration of the trigger pulses.

Continuing with FIG. 7, the device further comprises a monitoring circuit that monitors the amplitude of the voltage in ferrite core. The signal emitted from a control winding 7, which is coupled to the ferrite core 2, and is transmitted to an operational amplifier 12, which linearly reduce the voltage, and then to the microcontroller 15. The monitoring circuit signal is digitized by an ADC (analog-digital converter) 17, and transferred with control module 18 to the display controller 21, and finally transmitted to the digital display 5, thus allowing the indicator to reflect the oscillation amplitude in digital form. Digital thermometer 13 measure the temperature inside the housing of the device. Control module 18 controls the signal level and temperature, comparing the obtained levels with a predetermined thresholds. In case of abnormal level will detected, appropriate command will be send to the display controller 21 and digital display 5. Customer will see appropriate warning message.

Figure 8:
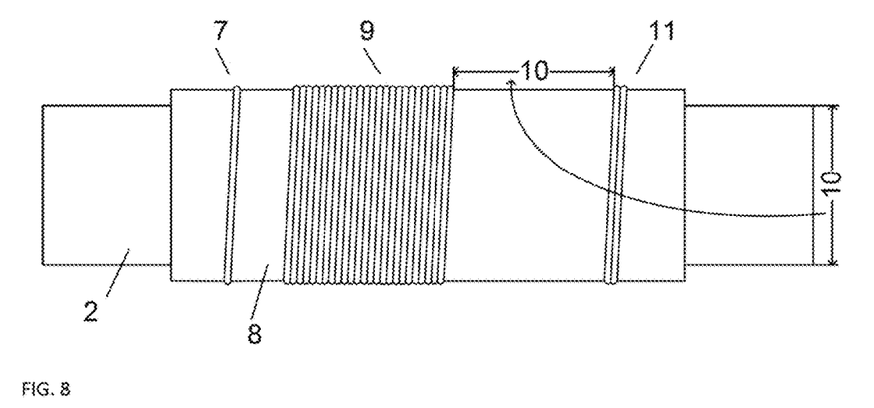
FIG. 8 represents design of the windings of emitter.
Figure 9:
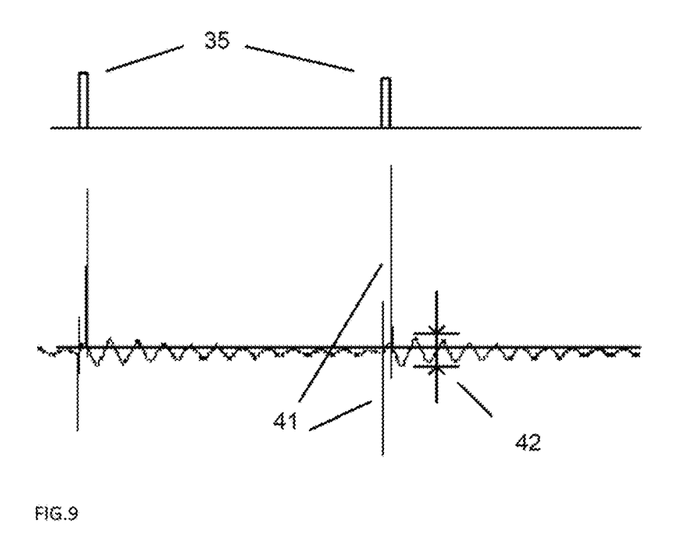
FIG. 9 represents a timing diagram of magnetic field inside the working area of device.

FIG. 8. represents design of emitter reel and windings (top view). Reel 8 is placed inside the housing 1. Primary ferrite core 2 is inside the reel 8. Over the reel 8 there are several windings: control winding 7, main winding 9 and energizing winding 11. Distance between main winding 9 and energizing, winding 11 is equal to ferrite core thickness 10. This causes the occurrence of high-frequency magnetic field splash 41 (FIG. 9, in compare with "typical" level 42), which increases the efficiency of water treatment, especially when installing the device on a plastic pipe.

Ferrite cores of the device have special dimensions to avoid formation of standing waves inside them. Their dimensions are not multiples of each other and are not divisible by two. For example: 123×29×21 mm (Length× Width×Height).

Figure 10:
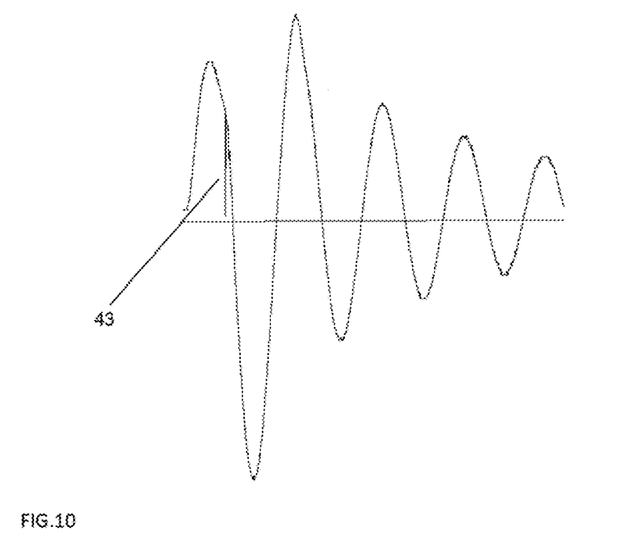
FIG. 10 represents high frequency release of energy.

Output resonant contour of the device have two capacitors installed in parallel—14, 16 (FIG. 7). One of them is made for working voltage slightly lower than other capacitor. This cause an effect comparable to the discharge, which is accompanied by a high-frequency splash 43 (FIG. 10). Experimentally confirmed that it increases the intensity of crystallization.

Optionally, the device has one or more additional emitters, installed to the same ferrite core 4 around a large diameter pipeline, and connected to the main emitter, to compensate the electromagnetic field damping in the long magnetic core.

Proposed device inhibits of bacteria or protozoa. The treatment of bacteria and protozoa may require a multiple processing of the water solution through ferrite core of device.

Proposed device induces an electric charges to the suspended particles of the impurity in the water. The attraction of oppositely charged particles launches the processes of flocculation and coagulation (enlargement of suspended particles). This reduces consumption of chemical reagents (flocculates and coagulates) and improves efficiency of filters. Using absorbent filter with quartz and load (or similar), improves the efficiency of coagulation due to the contact coagulation effect.

Figure 11:
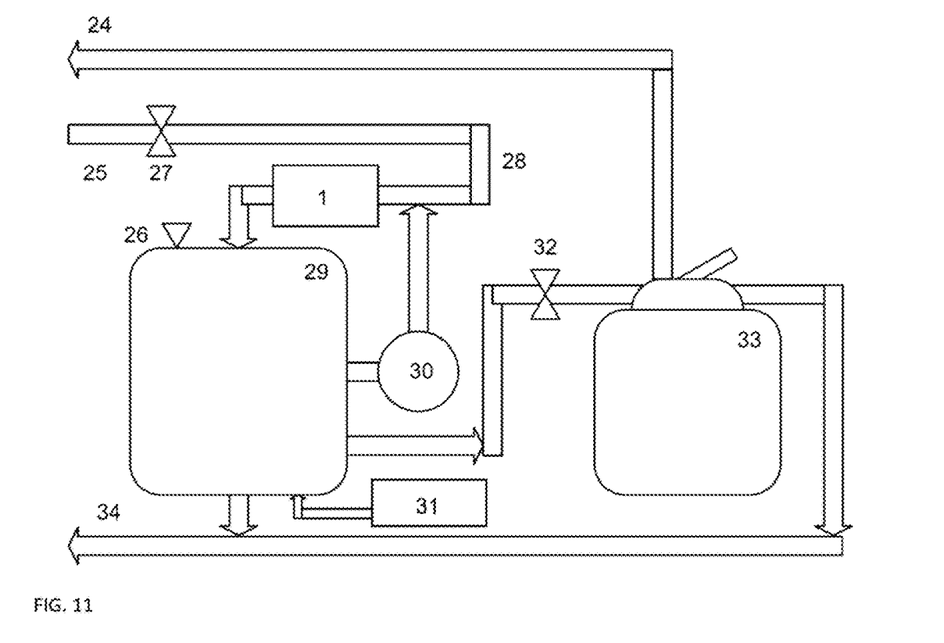
FIG. 11 represents a block diagram depicting another embodiment of the water treatment facility according to the present invention.

FIG. 11 represents an example block diagram of a water treatment facility employing the method of the present invention. The method comprises a device according to the present invention 1, positioned along a pipe 28 between the input stream of fluid 25 and the fluid reaction tank 29. The method further comprises an absorbent filter 33 with quartz sand or similar, a fluid pump 30 providing multiple circulation of the water, an air compressor 31, an air valve 26, fluid valves 27 and 32, a drain channel 34, an output (i.e. treated) stream of fluid 24, and control elements. The fluid pump 30 provides a multiple circulation of the treated water solution through the device 1. When the fluid has an excessive amount of dissolved iron ($Fe^{2+}$), the air compressor 31 injects air into the bottom part of the fluid reaction tank 29. The air is necessary for intensive oxidizing of iron ions. The excessive air is removed from the fluid reaction tank 29 through the air valve 26. The treatment of water solutions by the device 1 promotes the coagulation and flocculation of suspended particles and intensive oxidizing of iron ions. Iron oxides and suspended particles are easily filtered with the absorbent filter 33. The absorbent filter 33 should be cleaned periodically using the drain channel 34.

The present invention provides for a significantly improved cleaning and treatment efficiency in comparison with analogs, due to the creating structures in the water and subsequent destruction of these structures, which cause weak cavitation. The program creating the sequence of pulses is also very flexible and is not random, thus also improving upon the prior art. The program further allows for the ability to implement several approaches for pulse sequences. Finally, the digital indicator additionally provides a way to check the efficiency of the treatment and further acts as a useful troubleshooting tool.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or exemplary is intended to present concepts in a concrete fashion. As used in this application, the term "or" is intended to mean an inclusive or rather than an exclusive "or". That is, unless specified otherwise, or clear from context, "X employs A or B" is intended to mean any of the natural inclusive permutations. That is if X employs A; X employs B; or X employs both A and 13, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for treating a fluid, comprising:
attaching a radiowave generator to a pipe containing the fluid, the radiowave generator comprising at least a ferrite core, a main winding, and an energizing winding, wherein the distance between said main winding and said energizing winding is equal to a thickness of said ferrite core or a multiple of said thickness;
emitting from the radiowave generator at least two batches of at least three pulses into the fluid within the pipe.

2. The method of claim 1, further comprising: emitting a fourth pulse in each batch, all four pulses in each batch being the same.

3. The method of claim 1, wherein a time interval between pulses of a first batch is different than a time interval between pulses of a second batch.

4. The method of claim 1, further comprising: emitting a fourth pulse in each batch, wherein each fourth pulse has a lower amplitude than the first three pulses.

5. The method of claim 4, wherein a first pulse has a higher amplitude than a second pulse and a third pulse.

6. The method of claim 1, further comprising emitting one additional pulse with a lower amplitude between each pulse in each batch.

7. The method of claim 1, wherein an interval between the batches is variable.

8. The method of claim 1, wherein the pulses in each batch are triggered by triggering pulses, which have a period of 20-200 μs.

9. The method of claim 8, wherein the pulses in each batch are generated only in specific areas inside a range of operating frequencies of the triggering pulses.

10. The method of claim 1, wherein the pulses comprise exponentially decaying sinusoidal waves with a modulation frequency of 120-190 kHz.

11. The method of claim 1, further comprising emitting one additional pulse with a lower amplitude after each pulse in each batch.

12. A system for treating a fluid, comprising:
a programmable microcontroller to control operation of a radiowave generator;
the radiowave generator comprising at least a ferrite core, a main winding, and an energizing winding, wherein the distance between said main winding and said energizing winding is equal to a thickness of said ferrite core or a multiple of said thickness;
the radiowave generator generating at least two batches of electromagnetic pulses;
each batch comprising at least three pulses.

13. The system of claim 12, further comprising a processing unit and a feedback system, the feedback system sending signals to the processing unit which modifies pulses to target a particular fluid.

14. The system of claim 12, wherein the ferrite core having a plurality of detachable sections; the detachable sections being placed around a pipe and providing for adjustment of a position of the system on the pipe.

15. The system of claim 12, further comprising:
a reaction tank, the reaction tank being connected to a pipe with the fluid, the pipe being attached to the radiowave generator, and
a pump and valves positioned on the pipe, the pump and the valves providing for circulation of the fluid in the pipe and for multiple passing of a treatment area.

16. The system of claim 12, wherein the pulses comprise exponentially decaying sinusoidal waves with a modulation frequency of 120-190 kHz.

17. The system of claim 12, wherein a time interval between pulses of a first batch is different than a time interval between pulses of a second batch.

* * * * *